April 20, 1948.  E. R. BLOUT ET AL  2,440,070

OPTICAL FILTER AND METHOD OF MANUFACTURE

Filed Oct. 28, 1944

Cellulose Acetate Containing Cinnamalazine

INVENTORS
Elkan R. Blout
Ralph M. Potter
BY
Donald L. Brown
Attorney

Patented Apr. 20, 1948

2,440,070

UNITED STATES PATENT OFFICE 2,440,070

OPTICAL FILTER AND METHOD OF MANUFACTURE

Elkan R. Blout, Cambridge, and Ralph M. Gofstein, Haverhill, Mass., assignors to Polaroid Corporation, Cambridge, Mass., a corporation of Delaware Application October 28, 1944, Serial No. 560,800

15 Claims. (Cl. 88—115)

This invention relates to light-filtering materials, and more particularly to a new and improved light-filtering material substantially absorbing ultra violet radiation but substantially transmitting visible light.

It is a particular object of the present invention to provide ultra violet absorbing material having high extinction for ultra violet radiation as well as high stability thereto and which particularly will not fluoresce when exposed to ultra violet radiation.

A further object is to provide such ultra violet absorbing material in the form of a transparent carrier agent, either solid or liquid, having incorporated therein a selectively light-absorbing agent comprising an aromatic azine or substituted aromatic azine.

A still further object is to provide ultra violet absorbing material having the above advantages and comprising a sheet of transparent organic plastic material having incorporated therein an aromatic azine or substituted aromatic azine.

A still further object is to provide a process for producing the above ultra violet absorbing materials, and additional objects and advantages will in part appear and in part be pointed out in the course of the following detailed description of several embodiments of the invention, which are given as nonlimiting examples, in connection with the accompanying drawings, in which.

In accordance with the present invention, it has been discovered that certain novel and valuable properties with respect to the selective absorption of light rays in the ultra violet region of the spectrum are possessed by the group of compounds which may be generally designated as the aromatic azines and substituted aromatic azines. Said compounds may be represented most simply by the general formula

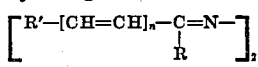

wherein $n$ may be zero or an integer, R may be hydrogen or any alkyl or aryl radical, and R' may be any aromatic group or condensed aromatic ring system. Specific examples of some of the simpler members of the class include benzalazine

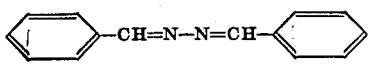

furfuralazine

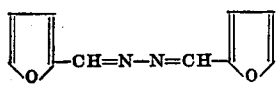

and cinnamalazine

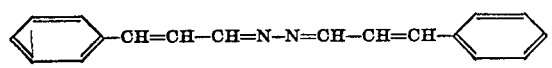

Figure 1:
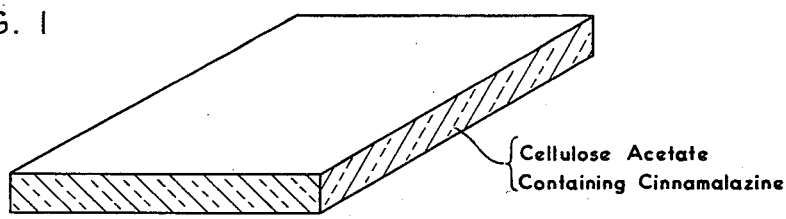
Figure 1 is a diagrammatic view of a light-filtering material illustrating an embodiment of the invention.

The present invention is directed to taking advantage of the ultra violet absorbing properties of the above compounds by incorporating them in suitable carriers in such manner that they may readily be used as light filters. For example, such a filter may be produced by incorporating one of said compounds in a sheet of transparent organic plastic, as illustrated at 10 in Fig. 1. In preparing such light-filtering material, the first step is to prepare the desired azine, which may be done conveniently from the corresponding aromatic aldehyde or ketone.

Figure 2:
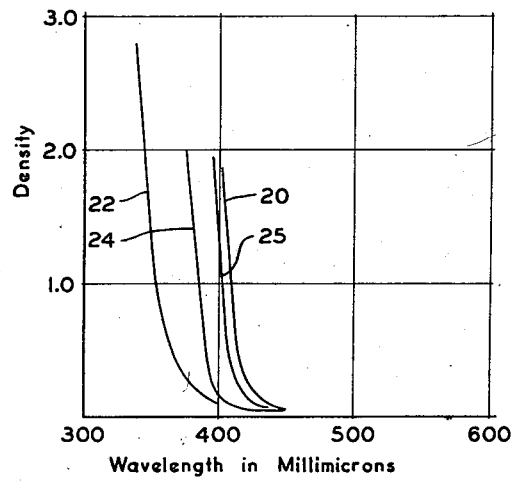
Figure 2 is a graph illustrating the optical densities of a variety of filters embodying forms of the invention.

Cinnamalazine has been found particularly useful for the purposes of the invention and will accordingly be used as an illustrative example of one embodiment thereof. Said compound may be conveniently prepared by shaking together 2.3 mols of cinnamaldehyde with 1 mol of 85% hydrazine hydrate in water or dilute ethyl alcohol and, if desired, purifying the resulting precipitate by recrystallization from ethanol or any other suitable solvent. The incorporation of the azine in the desired plastic carrier may be done conveniently by forming a solution of both materials in a suitable mutual solvent, casting or otherwise treating the solution to form a sheet and driving off the solvent. If, for example, the plastic is cellulose acetate, a suitable solvent will be ethyl acetate or a mixture of ethyl acetate and methanol. The optical density of the resulting sheet will depend upon both its thickness and the concentration of azine therein. For example, curve 20 in Fig. 2 illustrates the optical density of a sheet of cellulose acetate approximately 0.0040 inch in thickness and containing approximately 1% by weight of cinnamalazine. It will be noted that said curve illustrates a very sharp cut-off at approximately the boundary between the violet and the ultra violet, rising almost vertically between approximately 400 and 410 m$\mu$ to a value of the order of 2.0 at 400 m$\mu$.

This means that its transmission is only 1% at 400 mμ, and for shorter wavelengths the density is so high as to be impractical to measure and the absorption may be considered as substantially total.

The other curves in Fig. 2 illustrate the densities of other examples of the invention. In the case of curves 22 and 24, the absorbing agent is respectively 2% by weight of benzalazine and 1% by weight of furfuralazine. Curve 25 illustrates the corresponding properties of such a filter wherein the absorbing agent comprises 1% by weight of 1,1'-naphthalazine

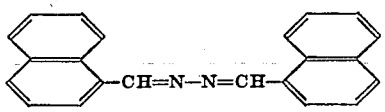

All of said azines may be prepared in the same manner as already described in connection with cinnamalazine by reaction between the corresponding aldehyde and hydrazine. The recrystallization solvent for benzalazine may comprise pyridine and for the other two may comprise ethanol. In each case the carrier for the azine is cellulose acetate approximately 0.0040 inch in thickness. All of these examples of embodiments of the invention have highly desirable properties as ultra violet absorbing filters. The sharp cut-offs obtainable with said materials, as well as their high absorption of ultra violet radiation, are clearly illustrated by the curves in Fig. 2. In addition they are highly stable to ultra violet light, and they have also the unusual and highly valuable property of nonfluorescence in ultra violet light.

In accordance with the invention it has also been discovered that the same and still further advantages as ultra violet absorbers are possessed by the substituted members of the above class, which may be represented by the general formula $$\left[ R''-R-(CH=CH)_n-\underset{R}{C}=N- \right]_2$$

wherein R'' represents any substituent which can be substituted for hydrogen, such for example as an alkyl or aryl radical, a halogen, a nitro, hydroxyl or amino group, or the like, and the other symbols have the same meanings as given in connection with the first general formula hereinabove. In particular, it appears that the shape and position of the absorption curves of said substituted compounds may be to a considerable extent controlled by the selection both of the substituent and of the position substituted. This may be conveniently illustrated by considering a series of such substitution compounds, for example, the hydroxy-substituted benzalazines.

Figure 3:
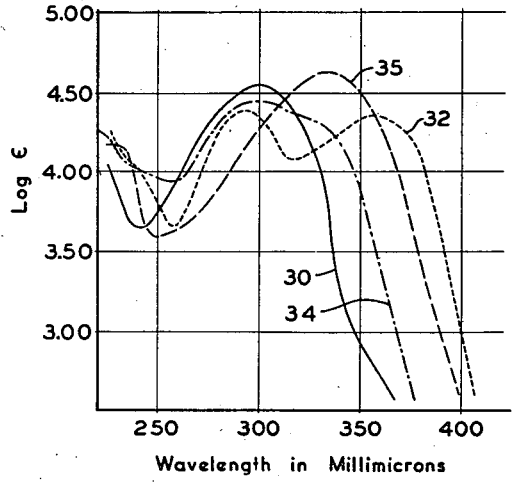
Figure 3 is a graph illustrating the molecular extinction coefficient of certain of the materials used in the practice of the invention.

Curve 30 in Fig. 3 illustrates the molecular extinction coefficient (log ε) of benzalazine as derived from the equation $$d = \epsilon c t$$

wherein $d$ is the optical density, $c$ is the concentration in mols per liter and $t$ is the thickness in centimeters. Curves 32, 34 and 35 illustrate the log ε dispersion of the ortho-, meta- and para-hydroxy compounds, respectively, of benzalazine. It should be noted first as to these curves both that each extends to higher wavelengths than is the case with the unsubstituted benzalazine, and that each shows an even sharper cut-off than with the unsusbstituted compound. Furthermore, each differs in at least one characteristic from the other two. The m-substituted compound shows the broadest absorption band without sharp peaks. The o-substituted compound is characterized by two peaks, one at approximately 295 mμ and the other at approximately 355 mμ. The p-substituted compound is characterized by the highest and sharpest peak as well as by its sharp cut-off. In fact, p-dihydroxy-benzalazine has a curve very nearly parallel to that of benzalazine except that its cut-off is even sharper at the longest absorbed wavelengths.

The spectral characteristics illustrated by Fig. 3 will be found to hold generally true for other isomeric substituted azines of the class with which the present invention is concerned. It will be apparent therefore that the appropriate substitution compound may readily be chosen to give any particular desired absorption characteristics with respect to breadth, spectral location and cut-off. In each case the substituted compounds absorb at longer wavelengths than the unsubstituted, but the difference between the two cut-offs may be controlled by choice of the substituted substituents. Thus if the substituted group is one tending to give up electrons to the aromatic ring, for example a hydroxyl or methoxyl group, the shift of the absorption curve towards the red end of the spectrum is much greater than when the substituted group is one tending to draw electrons from the ring, for example a nitro group.

The present invention is applicable to a wide variety of materials, both as to the absorbing agent and as to the carrier therefor. No theoretical limits have been found as to the absorbing agent provided it conforms with the above general structural formulae. Examples of some varied compounds wherein R is other than hydrogen include acetophenoneazine

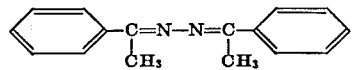

benzophenoneazine

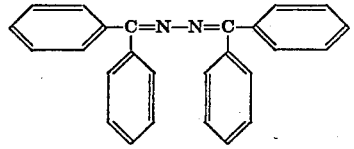

and fluorenoneazine

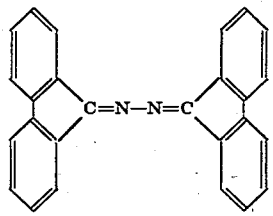

It appears that the substitutions on the ring may be at any position and may comprise any substituent which can be substituted for hydrogen, may be at more than one position, and in the latter case may be the same or different. This may be expressed in a general formula for the case of benzene compounds by modifying the second above general formula to

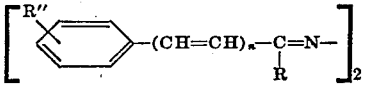

Wherein R'' may be at any one or more positions on the ring and represents any one or more substituents which can be substituted for hydrogen. All these compounds may be readily prepared from the corresponding aromatic aldehyde or ketone by reaction as described above with hydrazine. In some cases the hydrazone may form, but it can readily be decomposed to the azine by adding to the recrystallization solution a drop of an acid such as hydrochloric acid. Examples of some such varied compounds found useful in the practice of the invention include, in addition to those already given, the azines of the isomeric aminobenzaldehydes, nitrobenzaldehydes, methoxybenzaldehydes, ethoxybenzaldehydes, dimethylaminobenzaldehydes and isopropylbenzaldehydes. It is to be understood, however, that this list is given merely as illustrative of some of the compounds coming within the scope of the invention.

A wide variety of carrier agents may be used for the selectively light-absorbing agents of the invention. In addition to the cellulose acetate already mentioned, other suitable cellulosic plastics include cellulose nitrate and cellulose acetate butyrate. Polyamide plastics of the nylon type may also be used as well as vinyl compounds such as polyvinyl alcohol. It will be apparent that choice of the carrier agent will depend partly on the conditions under which the filters will be used and also will be limited to the extent that the carrier and absorbing agent should be soluble in a mutual solvent. In the case of water soluble plastics such as polyvinyl alcohol the azine may be incorporated therein by first forming a water soluble azine salt such for example as the disodium salt in the case of hydroxy-substituted compounds and the hydrochloride in the case of the amino compounds. It will be apparent that the use of such carrier is limited to such of the azines as will form water soluble salts without alteration of their absorption characteristics. It will also be apparent that the azines of the invention may be used in liquid solution, although the practicability of such use may be limited.

It will also be apparent that the plastic light-filtering material of the invention may readily be provided with any suitable protective means. For example, the sheets of cellulose acetate described hereinabove may be bonded between additional thicker and clear layers of cellulose acetate by means of any suitable solvent such as acetone, or may be bonded between layers of glass by any suitable adhesive such as an incomplete polyvinyl acetal resin plasticized with raw castor oil. Other such modifications of the invention will be readily apparent to those skilled in the art and are to be construed as coming within the scope hereof.

Since certain changes in carrying out the above process, and certain modifications in the product which embody the invention may be made without departing from its scope, it is intended that all matter contained in the above description, or shown in the accompanying drawings shall be interpreted as illustrative and not in a limiting sense.

What is claimed is:
1. As a new product, a light-filtering material adapted to absorb ultra violet radiation, said material comprising a light-transmitting carrier having incorporated therein a compound of the general formula

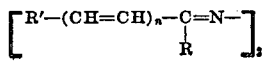

wherein $n$ is selected from the group consisting of zero and one, R represents a member of the class consisting of hydrogen and alkyl and aryl radicals, and R' represents a member of the class consisting of aromatic hydrocarbon rings, condensed aromatic hydrocarbon ring systems, aromatic oxygen-containing heterocyclic rings and condensed aromatic oxygen-containing heterocyclic ring systems.

2. As a new product, a light-filtering material adapted to absorb ultra violet radiation, said material comprising a light-transmitting carrier having incorporated therein a compound of the general formula

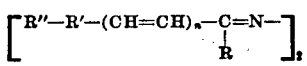

wherein $n$ is selected from the group consisting of zero and one, R represents a member of the class consisting of hydrogen and alkyl and aryl radicals, R' represents a member of the class consisting of aromatic hydrocarbon rings, condensed aromatic hydrocarbon ring systems, aromatic oxygen-containing heterocyclic rings and condensed aromatic oxygen-containing heterocyclic ring systems, and R'' represents at least one substituent from the class consisting of alkyl and aryl radicals and halogen, nitro, hydroxyl and amino groups.

3. As a new product, a light-filtering material adapted to absorb ultra violet radiation, said material comprising light-transmitting carrier having incorporated therein a compound of the general formula

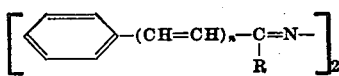

wherein $n$ is selected from the group consisting of zero and one, and R represents a member of the class consisting of hydrogen and alkyl and aryl radicals.

4. As a new product, a light-filtering material adapted to absorb ultra violet radiation, said material comprising a light-transmitting carrier having incorporated therein a compound of the general formula

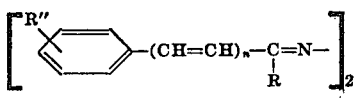

wherein $n$ is selected from the group consisting of zero and one, R represents a member of the class consisting of hydrogen and alkyl and aryl groups, and R'' is in any position on the benzene ring and represents at least one substituent from the class consisting of alkyl and aryl radicals and halogen, nitro, hydroxyl and amino groups.

5. As a new product, a light-filtering material adapted to absorb ultra violet radiation, said material comprising a sheet of light-transmitting organic plastic material having incorporated therein a compound of the general formula

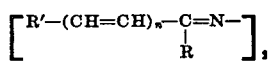

wherein $n$ is selected from the group consisting of zero and one, R represents a member of the class consisting of hydrogen and alkyl and aryl radicals, and R' represents a member of the class consisting of aromatic hydrocarbon rings, condensed aromatic hydrocarbon ring systems, aromatic oxygen-containing heterocyclic rings and condensed aromatic oxygen-containing heterocyclic ring systems.

6. As a new product, a light-filtering material adapted to absorb ultra violet radiation, said material comprising a sheet of light-transmitting organic plastic material having incorporated therein a compound of the general formula

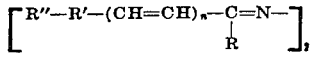

wherein $n$ is selected from the group consisting of zero and one, R represents a member of the class consisting of hydrogen and alkyl and aryl radicals, R' represents a member of the class consisting of aromatic hydrocarbon rings, condensed aromatic hydrocarbon ring systems, aromatic oxygen-containing heterocyclic rings and condensed aromatic oxygen-containing heterocyclic ring systems, and R'' represents at least one substituent from the class consisting of alkyl and aryl radicals and halogen, nitro, hydroxyl and amino groups.

7. As a new product, a light-filtering material adapted to absorb ultra violet radiation, said material comprising a sheet of light-transmitting organic plastic material having incorporated therein a compound of the general formula

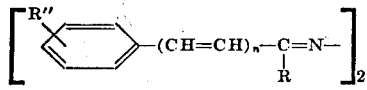

wherein $n$ is selected from the group consisting of zero and one, R represents a member of the class consisting of hydrogen and alkyl and aryl groups, and R'' is in any position on the benzene ring and represents at least one substituent from the class consisting of alkyl and aryl radicals and halogen, nitro, hydroxyl and amino groups.

8. As a new porduct, a light-filtering material adapted to absorb ultra violet radiation, said material comprising a sheet of light-transmitting organic plastic material having incorporated therein a compound of the general formula

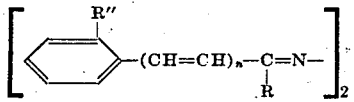

wherein $n$ is selected from the group consisting of zero and one, R represents a member of the class consisting of hydrogen and alkyl and aryl radicals, and R'' is a substituent selected from the class consisting of alkyl and aryl radicals, halogen, nitro, hydroxyl and amino groups.

9. As a new product, a light-filtering material adapted to absorb ultra violet radiation, said material comprising a sheet of light-transmitting organic plastic material having incorporated therein a compound of the general formula

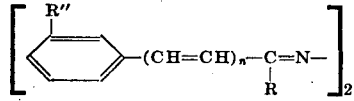

wherein $n$ is selected from the group consisting of zero and one, R represents a member of the class consisting of hydrogen and alkyl and aryl radicals, and R'' is a substituent selected from the class consisting of alkyl and aryl radicals, halogen, nitro, hydroxyl and amino groups.

10. As a new product, a light-filtering material adapted to absorb ultra violet radiation, said material comprising a sheet of light-transmitting organic plastic material having incorporated therein a compound of the general formula

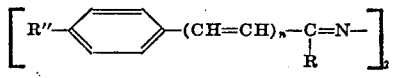

wherein $n$ is selected from the group consisting of zero and one, R represents a member of the class consisting of hydrogen and alkyl and ary radicals, and R'' is a substituent selected from the class consisting of alkyl and aryl radicals halogen, nitro, hydroxyl and amino groups.

11. As a new product, a light-filtering material adapted to absorb ultra violet radiation, said material comprising a sheet of light-transmitting cellulosic plastic material having incorporated therein a compound of the general formula

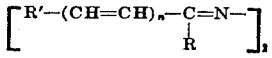

wherein $n$ is selected from the group consisting of zero and one, R represents a member of the class consisting of hydrogen and alkyl and ary radicals, and R' represents a member of the class consisting of aromatic hydrocarbon rings, condensed aromatic hydrocarbon ring systems, aromatic oxygen-containing heterocyclic rings and condensed aromatic oxygen-containing heterocyclic ring systems.

12. As a new product, a light-filtering material adapted to absorb ultra violet radiation, said material comprising a sheet of light-transmitting plastic material comprising cellulose acetate, said sheet having incorporated therein a compound of the general formula

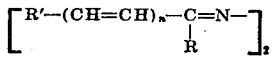

wherein $n$ is selected from the group consisting of zero and one, R represents a member of the class consisting of hydrogen and alkyl and aryl radicals, and R' represents a member of the class consisting of aromatic hydrocarbon rings, condensed aromatic hydrocarbon ring systems, aromatic oxygen-containing heterocyclic rings and condensed aromatic oxygen-containing heterocyclic ring systems.

13. As a new product, a light-filtering material adapted to absorb ultra violet radiation, said material comprising a sheet of light-transmitting plastic material comprising cellulose acetate, said sheet having incorporated therein a compound of the general formula

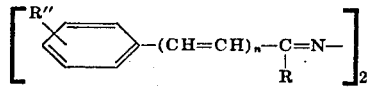

wherein $n$ is selected from the group consisting of zero and one, R represents a member of the class consisting of hydrogen and alkyl and aryl groups, and R'' is in any position on the benzene ring and represents at least one substituent from the class consisting of alkyl and aryl radicals and halogen, nitro, hydroxyl and amino groups.

14. As a new product, a light-filtering material adapted to absorb ultra violet radiation, said material comprising a sheet of light-transmitting plastic material comprising cellulose acetate and having incorporated therein a selectively light-absorbing agent comprising cinnamalazine.

15. In a process of forming light-filtering material substantially absorbing ultra violet radiation, the steps comprising forming a mutual solvent a solution comprising a light-transmitting organic plastic material and a compound comprising cinnamalazine, and then casting said solution to form a sheet, and substantially removing the solvent from said sheet.

ELKAN R. BLOUT.
RALPH M. GOFSTEIN.

REFERENCES CITED

The following references are of record in the file of this patent:

UNITED STATES PATENTS

| Number | Name | Date |
|---|---|---|
| 2,298,733 | Brooker et al. | Oct. 13, 1942 |
| 2,340,882 | Kendall | Feb. 8, 1944 |

---

Certificate of Correction

Patent No. 2,440,070 April 20, 1948

ELKAN R. BLOUT ET AL.

It is hereby certified that errors appear in the printed specification of the above numbered patent requiring correction as follows:

Column 3, line 73, for "unsusbstituted" read *unsubstituted*; column 7, line 39, for "porduct" read *product*; column 9, line 1, after the word "forming" insert *in*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*